(12) United States Patent
Park

(10) Patent No.: US 7,227,828 B2
(45) Date of Patent: Jun. 5, 2007

(54) HOLOGRAPHIC ROM SYSTEM

(75) Inventor: Joo Youn Park, Seoul (KR)

(73) Assignee: Daewoo Electronics Corporation, Seoul (KR)

( * ) Notice: Subject to any disclaimer, the term of this patent is extended or adjusted under 35 U.S.C. 154(b) by 560 days.

(21) Appl. No.: 10/849,223

(22) Filed: May 20, 2004

(65) Prior Publication Data

US 2005/0047308 A1 Mar. 3, 2005

(30) Foreign Application Priority Data

Aug. 25, 2003 (KR) .................. 10-2003-0058674

(51) Int. Cl.
*G11B 7/00* (2006.01)
(52) U.S. Cl. ...................... 369/103; 369/116
(58) Field of Classification Search ............ 369/44.23, 369/44.24, 120, 121, 122, 116, 103, 126
See application file for complete search history.

(56) References Cited

U.S. PATENT DOCUMENTS 4,733,253 A * 3/1988 Daniele ................. 347/247

| | | |
|---|---|---|
| 2002/0061033 A1 | 5/2002 | Kitaoka et al. |
| 2002/0075776 A1 | 6/2002 | Kasazumi et al. |
| 2003/0223101 A1 | 12/2003 | Curtis et al. |

FOREIGN PATENT DOCUMENTS

JP   2002-183955   6/2002

* cited by examiner

*Primary Examiner*—Nabil Hindi
(74) *Attorney, Agent, or Firm*—Bacon & Thomas, PLLC

(57) ABSTRACT

A holographic ROM system of the present invention includes a holographic disk for storing information in a form of hologram; a pick-up module for optically reading the information stored in the holographic disk and producing an electrical signal in response to what has been read; and a control unit. The pick-up module has at least two light sources which are controlled by the control unit and a temperature measuring device for measuring an operating temperature of said at least two light sources, and the temperature measuring device transmits a temperature signal indicating the operating temperature to the control unit.

18 Claims, 4 Drawing Sheets

HOLOGRAPHIC ROM SYSTEM

FIELD OF THE INVENTION

The present invention relates to a holographic ROM system; and more particularly, a holographic ROM system which is capable of suppressing deterioration in reliability of reconstructed data by reducing a wavelength variation rate of a reference beam to internal temperature of the holographic ROM system (or operating temperature of a light source).

BACKGROUND OF THE INVENTION

Referring to FIG. 1, there is provided a diagram of a conventional holographic ROM system. As shown in FIG. 1, the conventional holographic ROM system includes a holographic disk 120 as a recording medium for storing holograms, a pick-up module 100 for optically reading the holograms in the holographic disk 120 and then producing electrical signals in response to what has been read, a signal processing unit 150 for processing the electrical signals transmitted from the pick-up module 100, and a control unit 140 for controlling a first and a second actuator 102 and 116 and a spindle motor 130.

A reconstruction reference beam, generated from a light source 104 of the pick-up module 100, is reflected by a reflecting surface of a double sided reflecting section 106 to reach a mirror 108. The mirror 108 is, for example, an actuated mirror controlled by the control unit 140 in order for the reconstruction reference beam to reach the holographic disk 120 at an appropriate incidence angle. The reconstruction reference beam reflected by the mirror 108 reaches the holographic disk 120 through a reducing lens 110 at an incidence angle corresponding to that of a reference beam used in a data storing process, wherein the holographic disk 120 is rotated by the spindle motor 130 at a predetermined speed.

A part of the reconstruction reference beam incident upon the holographic disk 120 is diffracted to make a reconstructed signal beam. The reconstructed signal beam reaches the other reflecting surface of the double sided reflecting section 106 through a first lens 112, moved by the second actuator 116, and a second lens 114. Next, the reconstructed signal beam is reflected by the other reflecting surface of the double sided reflecting section 116 to reach a detector 118. The detector 118 transmits electrical signals to the signal processing unit 150 in response to the reconstructed signal beam.

In the holographic ROM system, a laser diode is generally used as the light source 104. The laser diode continuously emits heat during its operation, and a power supply of the holographic ROM system also emits heat. Therefore, due to such heat dissipation from the laser diode, the power supplying device and the like, internal temperature of the holographic ROM system, i.e., operating temperature of the laser diode, rises.

Referring to FIG. 2, there is illustrated a graph showing a wavelength variation of a laser beam generated from the laser diode, which depends on the operating temperature of the laser diode. When the operating temperature is 10° C., the wavelength of the laser beam generated from the laser diode is about 648 nm. However, as the operating temperature rises, the wavelength of the laser beam goes up. When the operating temperature is 70° C., the wavelength of the laser beam is about 658 nm, which is greater than the wavelength at 10° C. by 10 nm.

Further, in the conventional holographic ROM system, the data stored in the holographic disk 120 is reconstructed by a phase-conjugate readout method. Therefore, if the wavelength of the reconstruction reference beam generated from the light source 104 in a reconstruction process is considerably varied owing to change in the operating temperature of the laser diode as described above, the wavelength of the reconstruction beam may become greatly different from that of the reference beam used in the data storing process so that a level of the reconstructed signal beam obtained by the diffraction from the holographic disk goes down abruptly and, in a more serious case, such a situation as the reconstruction is impossible may occur.

Accordingly, the conventional holographic ROM system suffers from a drawback that the reliability of the reconstructed signal beam is degraded because of a high wavelength variation rate of the reconstruction reference beam generated from the light source to the operating temperature of the light source.

SUMMARY OF THE INVENTION

It is, therefore, an object of the present invention to provide a holographic ROM system which is capable of suppressing deterioration in reliability of a reconstructed signal by reducing a wavelength variation rate of a reference beam of a light source to operating temperature of the light source.

In accordance with one aspect of the invention, there is provided a holographic ROM system, including: a holographic disk for storing information in a form of hologram; a pick-up module for optically reading the information stored in the holographic disk and producing an electrical signal in response to what has been read; and a control unit, wherein the pick-up module includes at least two light sources which are controlled by the control unit and a temperature measuring device for measuring an operating temperature of said at least two light sources, and the temperature measuring device transmits a temperature signal indicating the operating temperature to the control unit.

In accordance with another aspect of the invention, there is provided a holographic ROM system, including: a holographic disk for storing information in a form of hologram; a pick-up module for optically reading the information stored in the holographic disk and producing an electrical signal in response to what has been read; and a control unit, wherein the pick-up module includes at least two light sources, at least two shutters for blocking or allowing beams of said at least two light sources to pass therethrough, which are controlled by the control unit, and a temperature measuring device for measuring an operating temperature of said at least two light sources, and the temperature measuring device transmits a temperature signal indicating the measured operating temperature to the control unit.

In accordance with another aspect of the invention, there is provided a holographic ROM system, including: a holographic disk for storing information in a form of hologram; a pick-up module for optically reading the information stored in the holographic disk, the pick-up module including at least two light source for generating at least two beams, a temperature measuring means for measuring an operating temperature of said at least two light sources to generate a temperature signal indicating the operating temperature, and a light adjuster for directing the reconstruction reference beam to the holographic disk to generate a reconstructed signal beam through a diffraction of the reconstruction reference beam to the holograms; and means for selecting one of said at least two beams as a reconstruction reference beam depending on the temperature signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
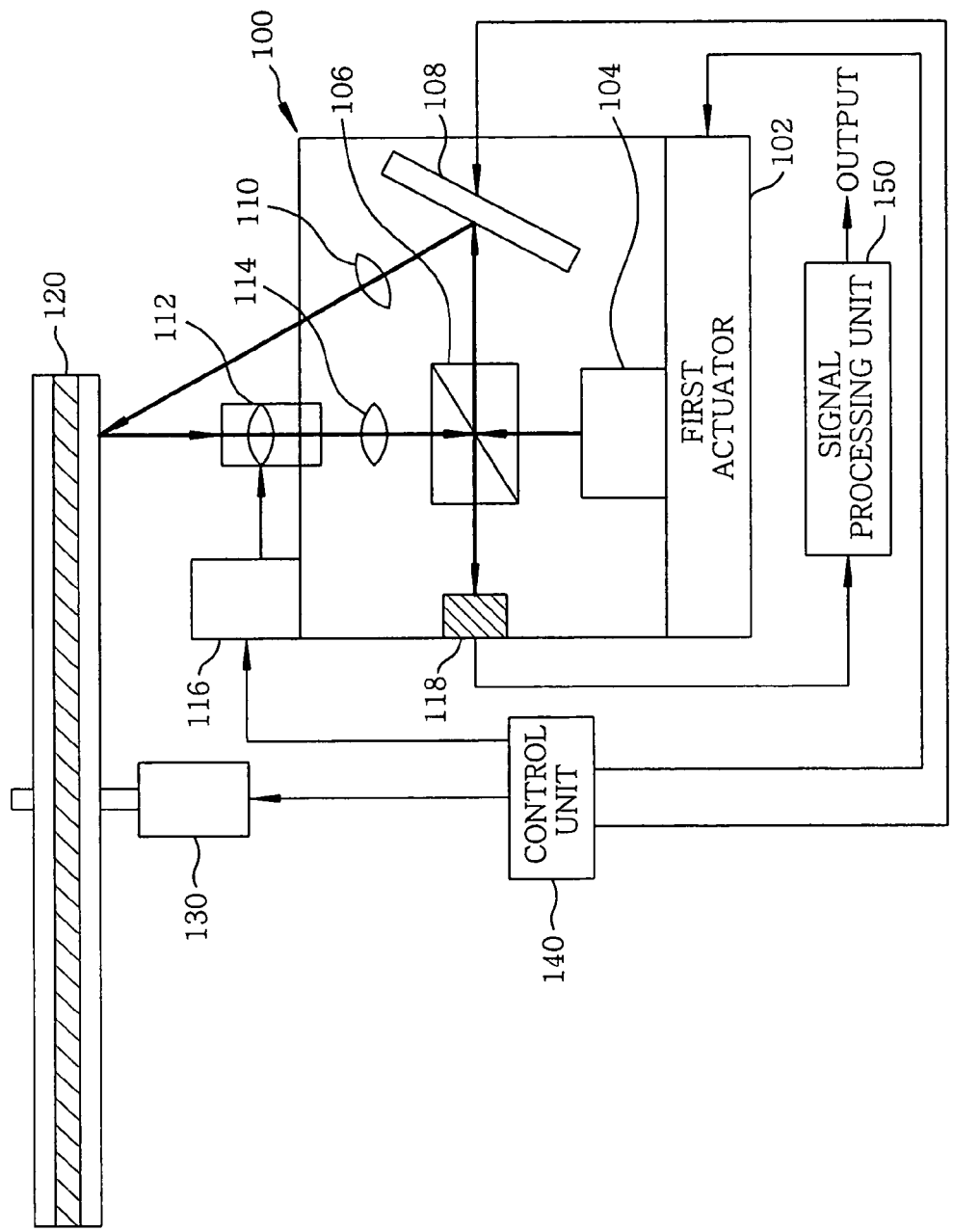
FIG. 1 is a diagram of a conventional holographic ROM system.
Figure 2:
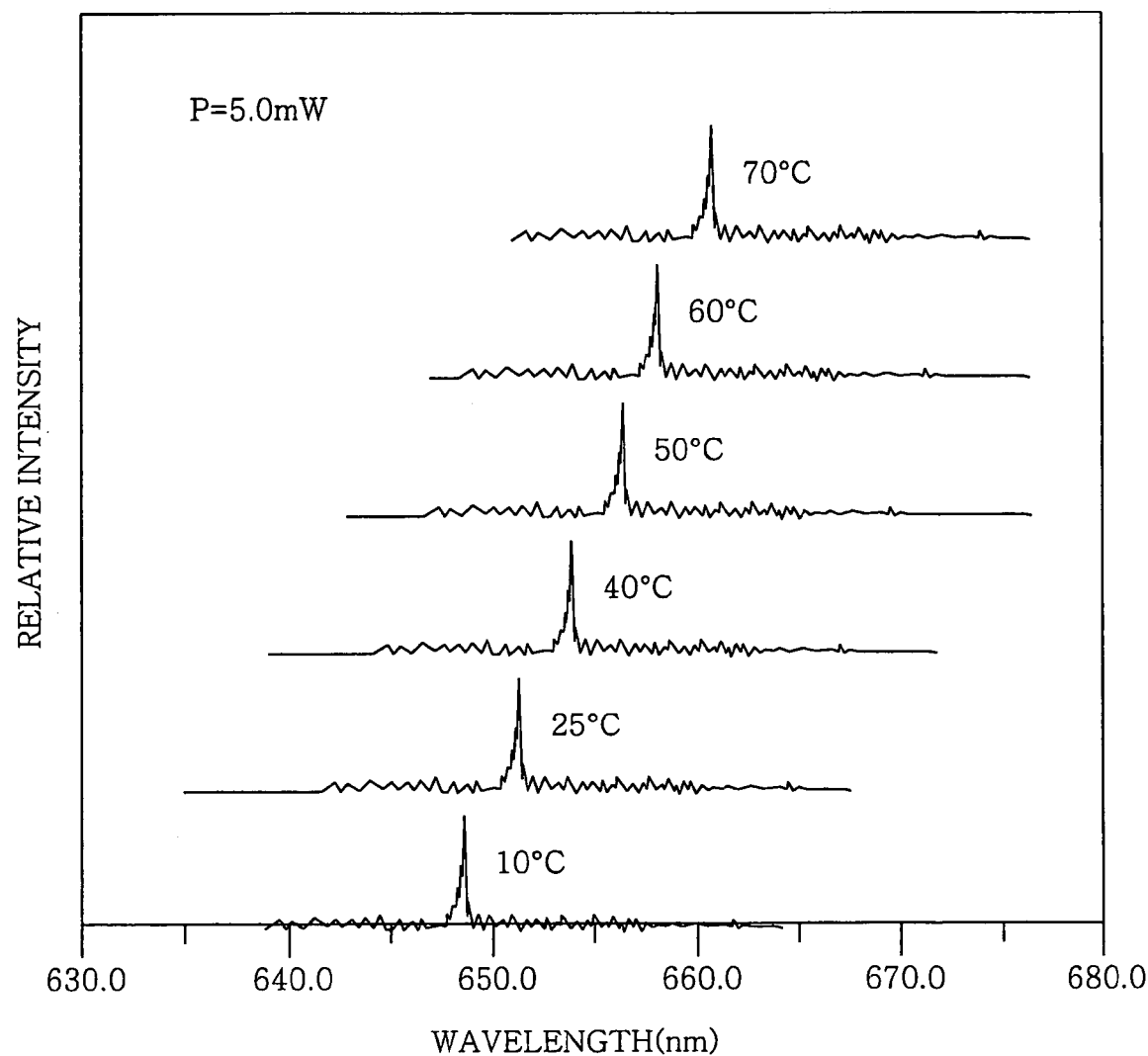
FIG. 2 presents a graph showing a wavelength variation of a laser beam generated from a laser diode versus an operating temperature.
Figure 3:
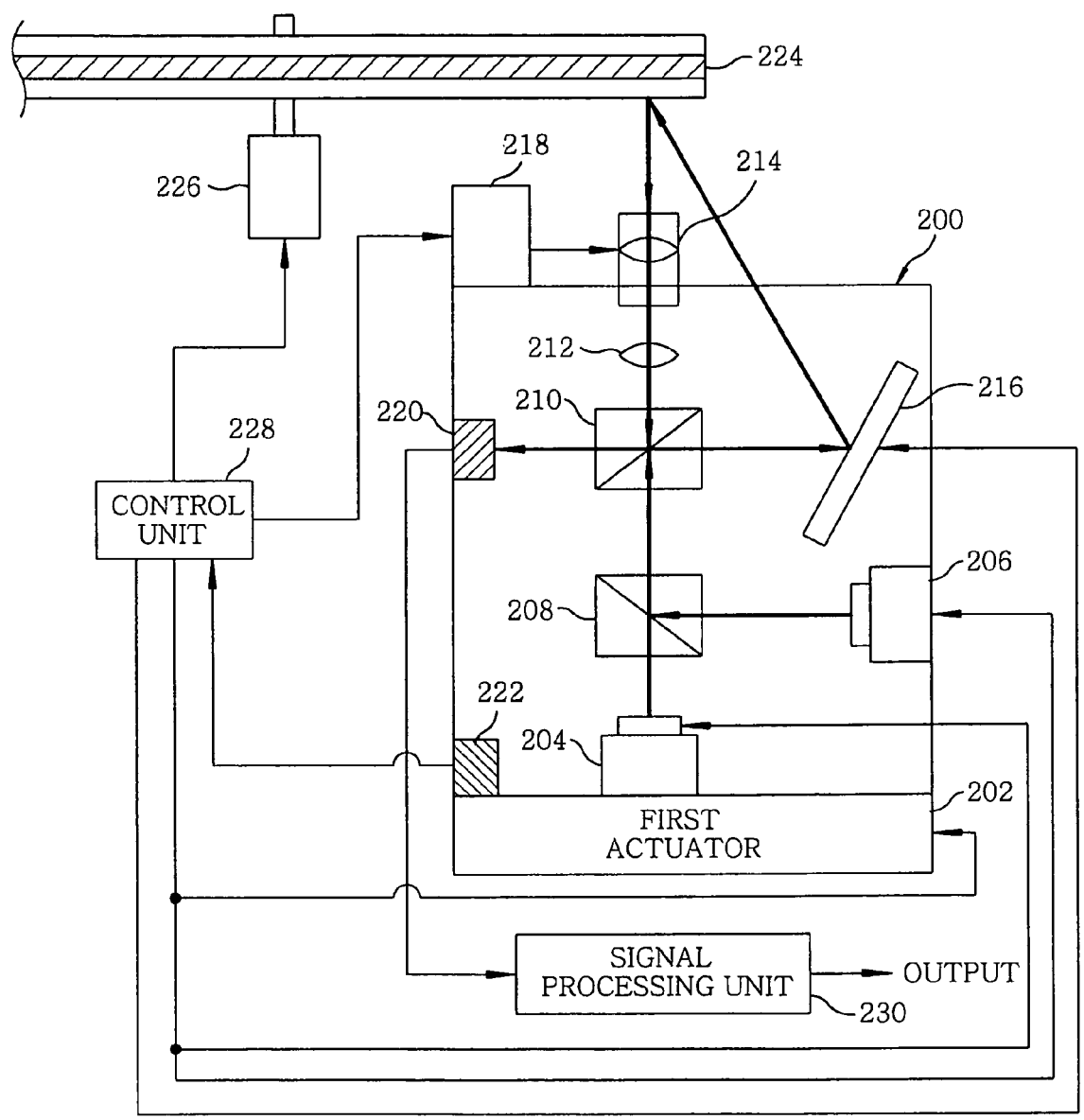
FIG. 3 illustrates a diagram of a holographic ROM system in accordance with the first preferred embodiment of the present invention.
Figure 4:
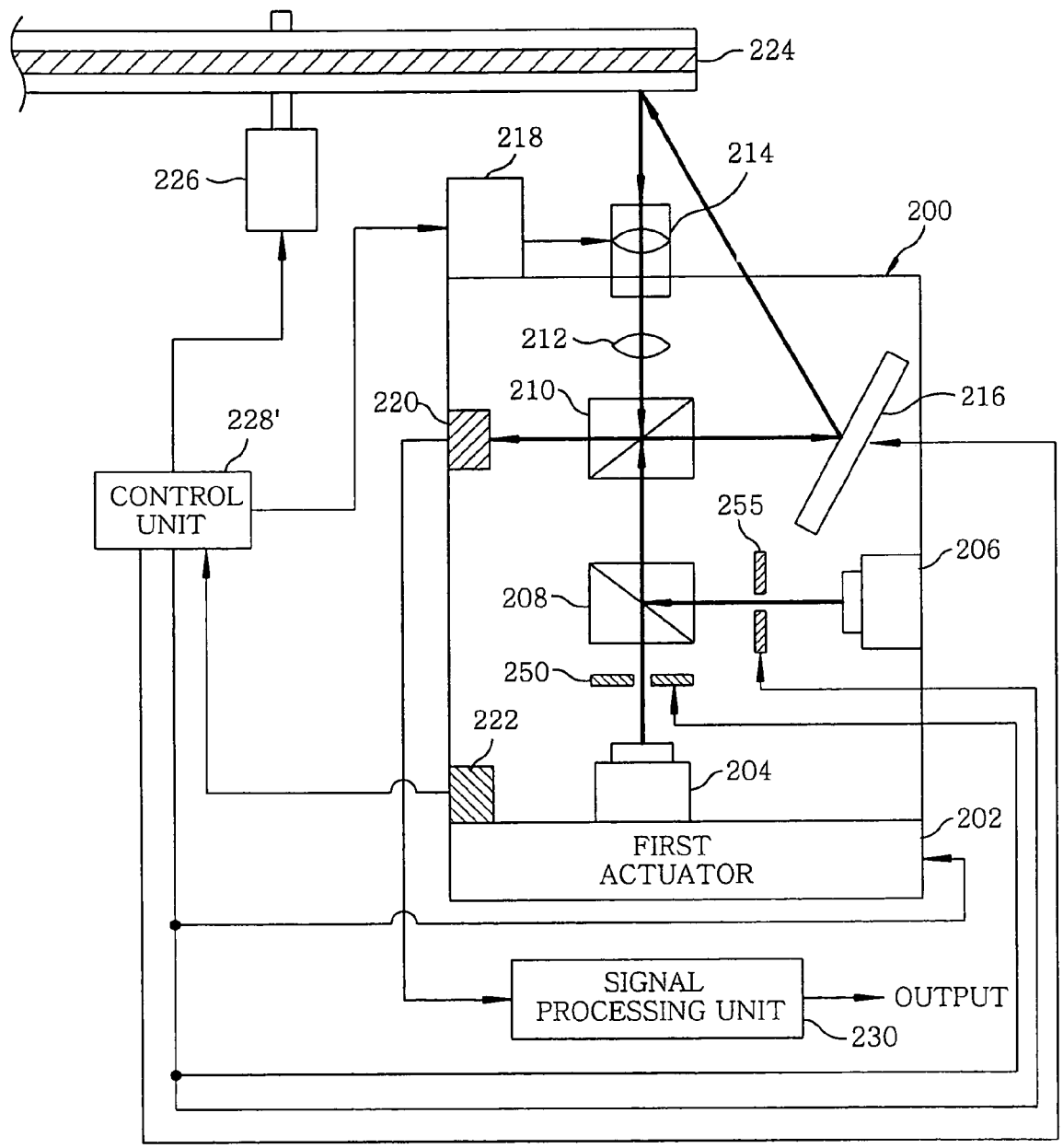
FIG. 4 sets forth a diagram of a holographic ROM system in accordance with the second preferred embodiment of the present invention.

Preferred embodiments of the present invention will now be described in detail with reference to the accompanying drawings, wherein like parts appearing FIGS. 3 and 4 are represented by like reference numerals.

Referring to FIG. 3, there is presented a diagram of a holographic ROM system in accordance with the first preferred embodiment of the present invention. As shown in FIG. 3, the holographic ROM system basically includes a holographic disk 224 for storing information in a form of hologram, which is mounted on a spindle motor 220; a pick-up module 200 for optically reading the information stored in the holographic disk 224 and generating an electrical signal in response to what has been read; a first actuator 202 for moving the pick-up module 200 in a radial direction relative to the holographic disk 224; a signal processing unit 230 for processing the electrical signal transmitted from the pick-up module 200; and a control unit 228 for controlling the spindle motor 226, the pick-up module 200 and the first actuator 202.

The pick-up module 200 is provided with a first and a second light source 204 and 206 for producing a first and a second beam as a reconstruction reference beam, respectively, a temperature sensor 222 for measuring internal temperature of the holographic ROM system, i.e., operating temperature of the first and the second light source 204 and 206 and transmitting to the control unit 228 a temperature signal indicating the operating temperature, and a light adjuster for directing the reconstruction reference beam generated from one of the first and the second light source 204 and 206 to the holographic disk 224 and directing a reconstructed signal beam obtained by a diffraction of the reconstruction reference beam by the holographic disk 224 to a detector 220.

The first and the second light source 204 and 206 have different temperature characteristics from each other. That is, the first light source 204 serving as a main light source generates within a first operating temperature range a first beam which has a wavelength substantially identical to that of a reference beam used for storing the holograms in the holographic disk 224 while the second light source 206 serving as a supplementary light source generates within a second operating temperature range a second beam which has the wavelength substantially identical to that of the reference beam used for storing the holograms in the holographic disk 224, wherein temperature within the second temperature range is higher than that within the first temperature range. The first light source 204 is, for example, a laser diode which generates within a temperature range of from 10° C. to 40° C. the first beam having a central wavelength of 650 nm and a wavelength variation less than 5 nm while the second light source 206 is a laser diode which generates within a temperature range of from 40° C. to 70° C. the second beam having a central wavelength of 650 nm and a wavelength variation less than 5 nm.

The light adjuster is provided with a beam splitter 208 for directing the first and the second beam as the reconstruction reference beam, a double sided reflecting section 210 for reflecting the reconstruction reference beam from the beam splitter 208, a mirror 216 for reflecting the reconstruction reference beam coming from the double sided reflecting section 210 in a manner that it can be incident upon the holographic disk 224 at an appropriate incidence angle, and a first and a second lens 214 and 212 for making the reconstructed signal beam obtained by the diffraction of the reconstruction reference beam by the holographic disk 224 suitable for the detector 220.

Specifically, the beam splitter 208 for directing the first and the second beam generated by the first and the second light source 204 and 206 as the reconstruction reference beam to the double-sided reflecting section 210 is disposed at a perpendicularly intersecting point of the first and the second beam generated by the first and the second light source 204 and 206, respectively. The first light source 204 and the beam splitter 208 are arranged in a manner that the first beam emitted from the first light source 204 reaches the double-sided reflecting section 210 of the light adjuster by transmitting the beam splitter 208. Meanwhile, the second light source 206 and the beam splitter 208 are arranged in a manner that a part of the second beam emitted from the second light source 206 is deflected 90° by the beam splitter 208 to reach the double sided reflecting section 210. The reconstruction reference beam is reflected by a reflecting surface of the double sided reflecting section 210 to reach the mirror 216.

In order for the reconstruction reference beam to reach the holographic disk 120 at the appropriate incidence angle, the mirror 216 is, for example, an actuated mirror controlled by the control unit 228. The reconstructed signal beam which has passed through the first and the second lens 214 and 212 is reflected by the other reflecting surface of the double sided reflecting section 210 toward the detector 220. The first lens 214 is moved by a second actuator 218 which is controlled by the control unit 228.

The temperature sensor 222 measures the internal temperature of the holographic ROM system, i.e., the operating temperature of the first and the second light source 204 and 206, and transmits a temperature signal indicating the operating temperature to the control unit 228. The control unit 228 turns on one of the first and the second light source 204 and 206 according to the temperature signal transmitted from the temperature sensor 222. That is, if the operating temperature is within the first temperature range, the control unit 228 turns on the first light source 204 and, if the operating temperature is within the second temperature range, the control unit 228 turns on the second light source 206. Further, if the operating temperature is less than the first temperature range, the control unit 228 turns on the first light source 204. And if the operating temperature is greater than the second temperature range, the control unit 228 turns on the second light source 206. For example, if the measured operating temperature is within a range of from 10° C. to 40° C. (or less than 10° C.), the first light source 204 is turned on while the second light source 206 is turned off. And if the operating temperature is greater than 40° C. and not greater than 70° C. (or greater than 70° C.), the first light source 204 is turned off while the second light source 206 is turned on.

As described above, the holographic ROM system of the present invention can reduce the wavelength variation rate of the reference beam to the operating temperature of the light source, when compared with the conventional holographic ROM system having only one light source. Therefore, it can be suppressed that the reliability of the signal beam is deteriorated because of the wavelength variation caused by the change in the operating temperature.

The operation of the first preferred embodiment of the present invention will now be described.

The control unit 228 receives from the temperature sensor 222 the temperature signal indicating the operating temperature of the first and the second light source 204 and 206 upon the initiation of the reconstruction process. The control unit 228 determines whether the current operating temperature falls within the first or the second temperature range, and turns on one of the first and the second light source 204 and 206 according to this determination result. That is, if the operating temperature is within the first temperature range, the control unit 228 turns on the first light source 204 and, if the operating temperature is within the second temperature range, the control unit 228 turns on the second light source 206. Further, if the operating temperature is less than the first temperature range, the control unit 228 turns on the first light source 204. And if the operating temperature is greater than the second temperature range, the control unit 228 turns on the second light source 206.

The reconstruction reference beam generated by one of the first and the second light source 204 or 206 sequentially enters the beam splitter 208 and the light adjuster. The light adjuster sends the reconstruction reference beam at the appropriate incidence angle to the holographic disk 224, which is mounted on the spindle motor 226 rotating at a predetermined speed. Then, the light adjuster receives the reconstructed signal beam generated by the diffraction of the reconstruction reference beam by the holographic disk 224, and makes it suitable for the detector 220. The reconstructed signal beam which has been made suitable for the detector 220 is sent to the detector 220. The detector 220 produces to the signal processing unit 230 the electrical signal in response to the reconstructed signal beam incident thereupon.

Further, the control unit 228 receives the temperature signal indicating the operating temperature from the temperature sensor 222 at predetermined regular intervals. Whenever the control unit 228 receives the temperature signal, the control unit 228 determines whether the current operating temperature falls within the first temperature range or not, and turns on one of the first and the second light source 204 and 206 according to the determination result.

In the first preferred embodiment, only one supplementary light second, i.e., the second light source 206, is installed, but more than one supplementary light source can be installed to further reduce the wavelength variation rate of the reconstruction reference beam to the operating temperature by reducing the temperature range size. For example, the first light source 204 may be a laser diode which generates within a temperature range of from 10° C. to 30° C. a beam having a central wavelength of 650 nm and a wavelength variation less than 3 nm, the second light source 206 may be a laser diode which generates within a temperature range of from 30° C. to 50° C. a beam having a central wavelength of 650 nm and a wavelength variation less than 3 nm, and a third light source (not shown) may be a laser diode which generates within a temperature range of from 50° C. to 70° C. a beam having a central wavelength of 650 nm and a wavelength variation less than 3 nm. In such a case, the third light source may be disposed above or under the second light source 206 in a manner that a third beam emitted from the third light source perpendicularly intersects the first beam of the first light source 204. And another beam splitter (not shown) like the beam splitter 208 may be installed at a perpendicularly intersecting point of the first and the third beam of the first and the third light source in order to deflect a part of the beam from the third light source toward the double sided reflecting section 210. The control unit 228 may turn on one of the first, the second and the third light source according to the temperature range within which the operating temperature measured by the temperature sensor 222 falls.

Referring to FIG. 4, there is shown a diagram of a holographic ROM system in accordance with the second preferred embodiment of the present invention, wherein like parts to those of the first preferred embodiment are represented by like reference numerals and description therefor will be omitted for simplicity.

The holographic ROM system of the second preferred embodiment includes a first and a second shutter 250 and 255 for blocking or allowing the reconstruction reference beam of the first and the second light source 204 and 206 to pass therethrough, which are disposed in front of the first and the second light source 204 and 206, respectively. A control unit 228' receives the temperature signal from the temperature sensor 222, determines whether the current operating temperature is within the first or the second temperature range, and then, according to this determination, makes one of the first and the second shutter 250 and 255 opened to allow corresponding one of the first and the second beam emitted from the first and the second light source 204 and 206 to be selected as the reconstruction reference beam. That is, if the operating temperature is within the first temperature range, the control unit 228' makes the first shutter 204 opened and, if the operating temperature is within the second temperature range, the control unit 228' makes the second shutter 255 opened. Further, if the operating temperature is less than the first temperature range, the control unit 228' makes the first shutter 250 opened. And if the operating temperature is greater than the second temperature range, the control unit 228' makes the second shutter 255 opened. Preferably, the first and the second light source 204 and 206 are all turned on during the reconstruction process so that the operating temperature of the first light source 204 may be substantially identical to that of the second light source 206.

The operation of the holographic ROM system of the second preferred embodiment will now be described.

When the reconstruction process is initiated, the first and the second light source 204 and 206 are all turned on, and the first and the second shutter 204 and 206 are all closed. Then, the control unit 228' receives the temperature signal indicating the operating temperature from the temperature sensor 222, and determines the temperature range within which the operating temperature falls. Next, depending on the temperature range, the control unit 228' makes one of the first and the second shutter 250 and 255 opened to allow corresponding one of the first and the second beam emitted from the first and the second light source 204 and 206 to reach the beam splitter 208 as the reconstruction reference beam.

The control unit 228' receives the temperature signal indicating the operating temperature from the temperature sensor 222 at predetermined regular intervals, and determines the temperature range within which the operating temperature falls whenever it receives the temperature signal. And, depending on this determination result, the control unit 228' makes one of the first and the second shutter 250 and 255 opened instead of turning off one of the first and the second light source 204 and 206.

In this preferred embodiment, only one supplementary light source, i.e., the second light source 206, is installed, but more than one supplementary light source and shutter corresponding thereto can be installed in order to further reduce the wavelength variation rate of the reference beam to the operating temperature by reducing the temperature range size. For example, the first light source 204 may be a laser diode which generates within a temperature range of from 10° C. to 30° C. a beam having a central wavelength of 650 nm and a wavelength variation less than 3 nm, the second light source 206 may be a laser diode which generates within a temperature range of from 30° C. to 50° C. a beam having a central wavelength of 650 nm and a wavelength variation less than 3 nm, and a third light source (not shown) is a laser diode which generates within a temperature range of from 50° C. to 70° C. a beam having a central wavelength of 650 nm and a wavelength variation less than 3 nm. Further, the third light source may be disposed above or under the second light source in a manner that, and the third beam of the third light source perpendicularly intersects the first beam of the first light source 204. Moreover, a third shutter for blocking or allowing the third beam of the third light source to pass therethrough may be installed in front of the third light source. And another beam splitter like the beam splitter 208 may be disposed at a perpendicularly intersecting point of the first and the third beam of the first and the third light source in order to deflect a part of the third beam emitting from the third light source toward the double sided reflecting section 210. The control unit 228' may make one of the first, the second and the third shutter opened according to the temperature range within which the operating temperature falls.

Further, although the present invention is described with the holographic ROM system, the basic concept of the present invention can be applied to the CD-ROM system or DVD-ROM system.

As described above, in the holographic ROM system of the present invention, since the wavelength variation rate of the reconstruction reference beam to the operating temperature can be reduced, the deterioration in the reliability of signal reconstruction can be effectively suppressed even when the operating temperature rises.

While the invention has been shown and described with respect to the preferred embodiments, it will be understood by those skilled in the art that various changes and modifications may be made without departing from the spirit and scope of the invention as defined in the following claims.

What is claimed is:

1. A holographic ROM system, comprising:
   a holographic disk for storing information in a form of hologram;
   a pick-up module for optically reading the information stored in the holographic disk and producing an electrical signal in response to what has been read; and
   a control unit,
   wherein the pick-up module includes at least two light sources, which are controlled by the control unit, and a temperature measuring device for measuring an operating temperature of said at least two light sources, and the temperature measuring device transmits a temperature signal indicating the operating temperature to the control unit.

2. The holographic ROM system of claim 1, wherein said at least two light sources have different temperature characteristics.

3. The holographic ROM system of claim 2, wherein the control unit controls a first light source among said at least two light sources to be selected to operate within a first temperature range and the second light source among said at least two light source to be selected to operate within a second temperature range.

4. The holographic ROM system of claim 3, wherein the control unit determines whether the operating temperature measured by the temperature measuring device falls within the first or the second temperature range.

5. The holographic ROM system of claim 4, wherein the pick-up module further includes a beam splitter for transmitting a first beam of the first light source and deflecting at least a portion of a second beam of the second light source by 90°, and the beam splitter is disposed at a perpendicularly intersecting point of the first and the second beam of the first and the second light source.

6. The holographic ROM system of claim 5, wherein said at least two light sources are laser diodes.

7. The holographic ROM system of claim 6, wherein the first temperature range is not less than 10° C. and not greater than 40° C., and the first light source generates within the first temperature range a beam having a central wavelength of 650 nm and a wavelength variation less than 5 nm, and wherein the second temperature range is greater than 40° C. and not greater than 70° C., and the second light source generates within the second temperature range a beam having a central wavelength of 650 nm and a wavelength variation less than 5 nm.

8. A holographic ROM system, comprising:
   a holographic disk for storing information in a form of hologram;
   a pick-up module for optically reading the information stored in the holographic disk and producing an electrical signal in response to what has been read; and
   a control unit,
   wherein the pick-up module includes at least two light sources, at least two shutters for blocking or allowing beams of said at least two light sources to pass therethrough, which are controlled by the control unit, and a temperature measuring device for measuring an operating temperature of said at least two light sources, and the temperature measuring device transmits a temperature signal indicating the measured operating temperature to the control unit.

9. The holographic ROM system of claim 8, wherein said at least two light sources have different temperature characteristics.

10. The holographic ROM system of claim 9, wherein the control unit determines whether the operating temperature falls within a first or a second temperature range, makes a first shutter among said at least two shutters opened in case the operating temperature falls within the first temperature range, and makes a second shutter among said at least two shutters opened in case the operating temperature falls within the second temperature range.

11. The holographic ROM system of claim 10, wherein the pick-up module further includes a beam splitter for transmitting a first beam of the first light source and deflecting a part of a second beam of the second light source, and the beam splitter is disposed at a perpendicularly intersecting point of the first and the second beam of the first and the second light source.

12. The holographic ROM system of claim 11, wherein said at least two light sources are laser diodes.

13. The holographic ROM system of claim 12, wherein the first temperature range is not less than 10° C. and not greater than 40° C., and the first light source generates within the first temperature range a beam having a central wavelength of 650 nm and a wavelength variation less than 5 nm, and wherein the second temperature range is greater than 40° C. and not greater than 70° C., and the second light source generates within the second temperature range a beam having a central wavelength of 650 nm and a wavelength variation less than 5 nm.

14. A holographic ROM system, comprising:
- a holographic disk for storing information in a form of hologram;
- a pick-up module for optically reading the information stored in the holographic disk, the pick-up module including at least two light sources for generating at least two beams, a temperature measuring means for measuring an operating temperature of said at least two light sources to generate a temperature signal indicating the operating temperature, and a light adjuster for directing a reconstruction reference beam to the holographic disk to generate a reconstructed signal beam through a diffraction of the reconstruction reference beam to the holograms; and
- means for selecting one of said at least two beams as the reconstruction reference beam depending on the temperature signal.

15. The holographic ROM system of claim 14, wherein the selecting means is a control unit for turning on one of said at least two light sources depending on the temperature signal to generate one of said at least two beams as the reconstruction reference beam.

16. The holographic ROM system of claim 14, wherein the selecting means is a control unit, which controls at least two shutters to pass one of said at least two beams depending on the temperature signal, so that one of said at least two beams is selected as the reconstruction reference beam.

17. The holographic ROM system of claim 14, wherein said at least two light sources are at least two laser diodes.

18. The holographic ROM system of claim 14, wherein said at least two light sources are a first and a second light source for generating a first and a second beam, respectively, the first beam is selected if the operating temperature is within a first temperature range being not less than 10° C. and not greater than 40° C. while the second beam is selected if the operating temperature is within a second temperature range being greater than 40° C. and not greater than 70° C.

* * * * *